United States Patent Office 3,407,894
Patented Oct. 29, 1968

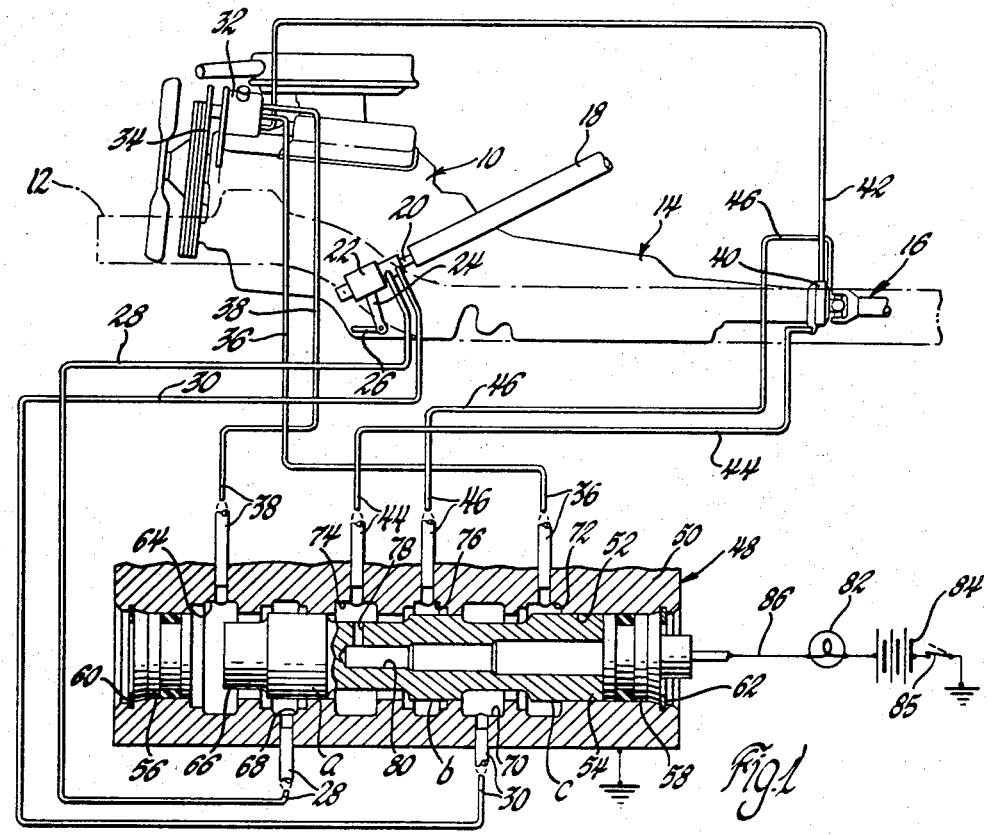

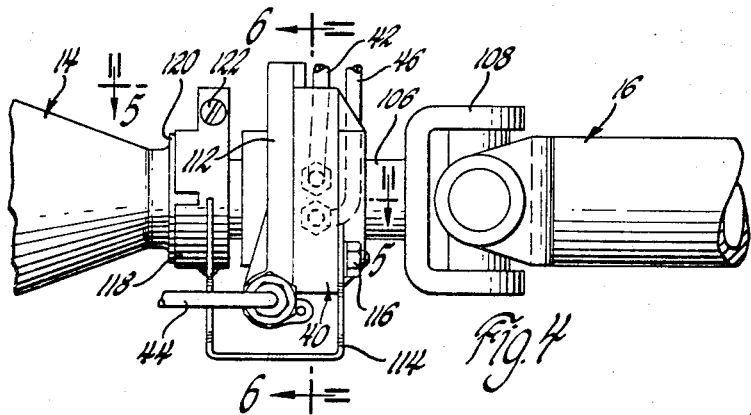
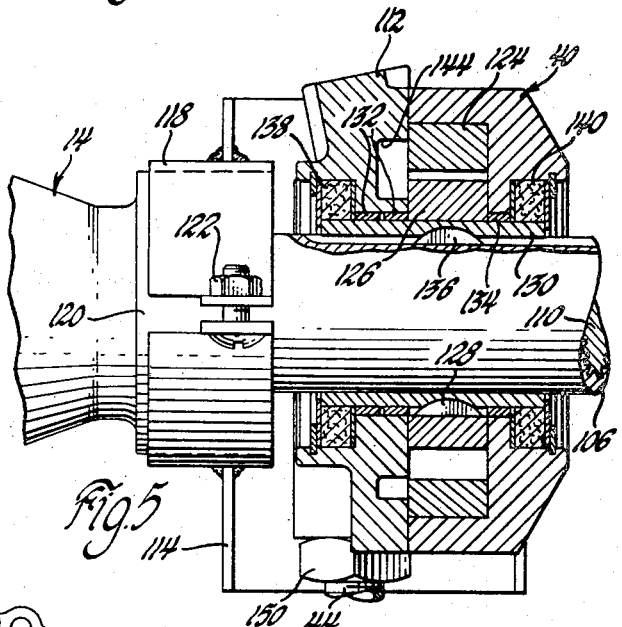
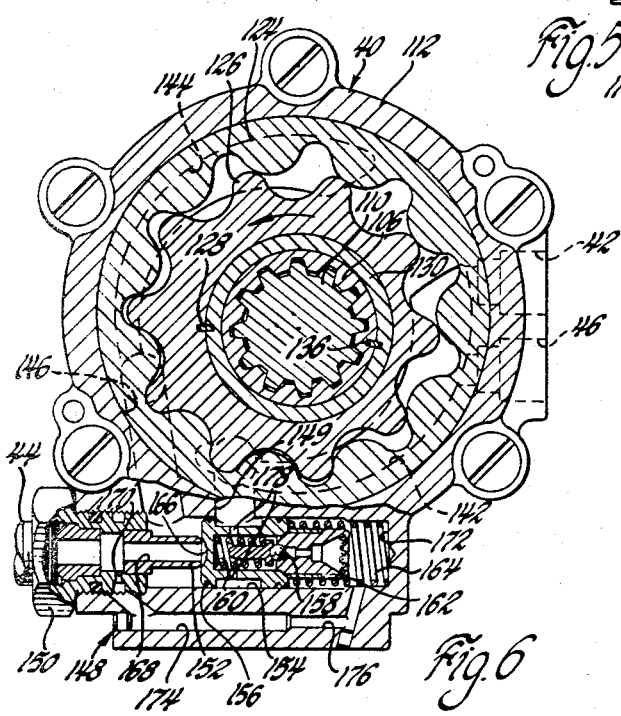
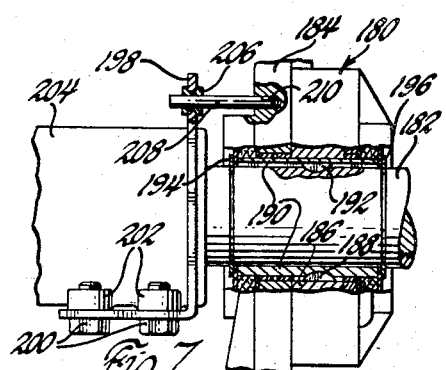

3,407,894
AUXILIARY MEANS ENERGIZING FLUID STEERING SYSTEM UPON DEACTIVATION OF MAIN PUMP
William B. Thompson, Frankenmuth, and Ronald Treloar and Claude A. Thorsby, Saginaw, Mich., assignors to General Motors Corporation, Detroit, Mich., a corporation of Delaware
Filed Mar. 22, 1965, Ser. No. 441,615
3 Claims. (Cl. 180—53)

ABSTRACT OF THE DISCLOSURE

A power steering system for a vehicle providing a power steering assist when the vehicle's engine is running and also when the engine is not running having an engine driven primary pump, an auxiliary pump driven by the vehicle's driving wheels and a valve normally connecting only the primary pump to the system and automatically connecting the auxiliary pump to the system when there is loss of pressure from the primary pump.

---

This invention relates to hydraulic systems and more particularly to power steering systems for vehicles.

In most power steering systems, power steering assist is available when the engine is running regardless of whether the vehicle is moving and power assist is lost when the engine is not running since conventional practice is to have the power steering pump engine driven. As one can readily observe, a distinct steering advantage could be obtained if power assist was not made solely dependent on engine operation and remained available for subsequent steering operation after the engine stops or the pump otherwise ceased to operate.

The principle of this invention lies in the marrying of an engine-driven power steering pump with an auxiliary pump in a power steering system so that power assist does remain available after the engine-driven pump ceases to operate to aid subsequent steering operation, for example, during vehicle coasting. This is accomplished in an illustrative embodiment by utilizing an engine-driven pump to serve as the primary pump for the power steering system and, in addition, employing a second or auxiliary pump. The auxiliary pump is connected to be driven in a simple and efficient manner by the propeller shaft of the vehicle's power train and serves to provide an auxiliary fluid pressure source for the power steering system when the primary pump is not available to serve the system. A transfer valve normally connects the primary pump to the system so long as the engine is running and is responsive to loss of pressure from the primary pump on engine stoppage to connect the auxiliary pump to serve the power steering system. Thus, all of the advantages of an engine-driven pump are available and, in addition, power steering assist remains available when the engine is not running so long as the vehicle is in motion such as during vehicle coasting and when the vehicle is being towed or pushed. A signal for the vehicle operator operated by the transfer valve is also provided to inform the vehicle operator when the auxiliary pump is serving the system.

An object of this invention is to provide a power steering system for an engine-driven vehicle which provides power steering assist when the engine is not running.

Another object of this invention is to provide a power steering system for an engine-driven vehicle which provides power steering assist when the engine is running and also when the engine is not running.

Another object of this invention is to provide in a vehicle power steering system, a primary pump for the system driven by the vehicle engine and an auxiliary pump driven off the vehicle power train past the transmission to serve the system when the engine is not operating and the vehicle is in motion.

Another object of this invention is to provide in a power steering system, a primary pump for the system driven by the vehicle engine, an auxiliary pump for the system driven by the vehicle driving wheels and a valve to connect the primary pump to the system when the engine is running and to connect the auxiliary pump to the system when there is loss of pressure from the primary pump while the vehicle is in motion.

Another object of this invention is to provide in a power steering system for a vehicle, an engine-driven primary pump, an auxiliary pump driven by the vehicle driving wheels through the vehicle's propeller shaft, a transfer valve for connecting the primary pump to the system when the engine is running and the auxiliary pump to the system when the engine is not running and the vehicle is in motion and a signal operated by the transfer valve to inform the vehicle operator when the auxiliary pump is being called on to serve the system.

These and other objects of the invention will be more apparent from the following description and drawing in which:

FIGURE 1 is a diagrammatic view of a preferred embodiment of the power steering system of this invention applied to a vehicle and shows the transfer valve conditioned for primary pump operation.

FIGURE 2 shows the transfer valve of FIGURE 1 conditioned for auxiliary pump operation.

FIGURE 3 is an enlarged view with parts in section of a portion of the transfer valve of FIGURE 1.

FIGURE 4 is an enlarged view of a portion of the structure including the auxiliary pump illustrated by FIGURE 1.

FIGURE 5 is a view taken substantially on the line 5—5 in FIGURE 4.

FIGURE 6 is a view taken substantially on the line 6—6 in FIGURE 4.

FIGURE 7 is a view similar to FIGURE 4 and shows an alternative mounting of the auxiliary pump with parts in section.

The power steering system, as illustrated in FIGURE 1, is employed in a vehicle having an engine 10 supported on the vehicle's frame structure 12 for powering through a variable ratio transmission 14, a propeller shaft assembly 16. The components thus far described are conventional and may be of any known suitable design as well as the remaining power train assembly, not shown, which would normally include a differential torque divider unit for connecting the propeller shaft assembly 16 to the vehicle's rear driving wheels.

The steering assembly comprises a steering column 18 supporting a steering shaft 20 mounting at its upper end the usual steering wheel, not shown, shaft 20 being operatively connected at its lower end to control a hydraulic power steering gear unit 22. Power steering gear unit 22 is preferably of the type shown in United States Patent No. 3,022,772 granted February 27, 1962, to Philip B. Zeigler et al. and operates a pitman arm 24 connected to a drag link 26 to steer through further conventional steering linkage, not shown, the vehicle's front wheels also not shown. Power assist for steering is made available on the supply of fluid under pressure to gear unit 22 via a feed line 28 with fluid return via a return line 30, the hydraulic and the mechanical operation of gear unit 22 being fully described in the above-mentioned United States Patent No. 3,022,772.

The supply of fluid under pressure to feed line 28 for power assist according to this invention is available from two separate sources. One source is provided by a pump 32 which is driven by the engine crankshaft through pulleys and a belt 34. This pump, which is preferably of the positive displacement type shown in copending United States patent application Ser. No. 283,219 filed May 27, 1963, by Philip B. Zeigler et al., thus operates only when the engine is running, receiving fluid at its intake side from a self-contained reservoir supplied by a primary return line 36 and discharging this fluid under pressure at its discharge side through a pump housed flow control valve to a primary outlet line 38.

The other source for fluid pressure supply for power steering assist is provided by a pump 40 which is driven by the propeller shaft assembly 16. This pump whose construction, operation and method of mounting is discused in detail later, has a filler line 42 connecting its intake side to the reservoir of pump 32 so that pump 40 thus requires no reservoir of its own and when driven delivers fluid under pressure to an auxiliary outlet line 44 with return to the intake side of this pump being via an auxiliary return line 46.

During normal vehicle operating conditions, the engine 10 is running and the transfer valve, generally designated at 48 automatically conditions itself for the primary pump operating condition shown in FIGURE 1 in which this valve connects the primary pump outlet line 38 to the gear unit feed line 28 and the gear unit return line 30 to the primary pump return line 36 for the primary pump 32 to serve the power steering gear unit 22. Transfer valve 48 in this condition also connects the auxiliary pump outlet line 44 to the auxiliary pump return line 46 so that the auxiliary pump 40 is conditioned for flow recirculation in which gear unit 22 is bypassed and thus pump 40 does not present a pumping load to the propeller shaft assembly 16 during normal vehicle operating conditions. In the event there occurs pump stoppage and the vehicle continues to coast or is otherwise in motion, the propeller shaft asembly 16 will be driven by the vehicle's rear wheels and thus drive pump 40. The transfer valve 48 will then automatically condition itself for the auxiliary pump operating condition shown in FIGURE 2. In this condition the auxiliary pump outlet line 44 is connected to the gear unit feed line 28 and the gear unit return line 30 is connected to the auxiliary pump return line 46 for the auxiliary pump 40 to serve the power steering gear unit 22. Valve 48, at the same time, blocks off the primary pump outlet line 38 and the primary pump return line 36 from the steering gear system.

The transfer valve 48 accomplishes the above results by being provided with a valve housing 50 having a bore 52 in which is slidably mounted a spool valve element 54 having equal diameter lands $a$, $b$ and $c$. Valve plug assemblies 56 and 58 are retained by retaining rings 60 and 62, respectively, in valve housing 50 to seal the opposite ends of valve bore 52.

At engine start up with the vehicle at rest, the fluid pressure supplied to the primary outlet line 38 by primary pump 32 is delivered via a connected annular port 64 in valve housing 50 to act on the left-hand end of valve element 54 urging this valve element against plug 58, as shown in FIGURE 1, to place the valve 48 in its primary pump operating condition. Valve 48 in this condition has the port 64 connected in the bore 52 past valve element neck 66 to an annular port 68 connected to the gear unit feed line 28; the gear unit return line 30 connected by an annular port 70 and between lands $b$ and $c$ to an annular port 72 connected to the primary pump return line 36; and the auxiliary pump outlet line 44 connected to an annular port 74 and between lands $a$ and $b$ to an annular port 76 connected to the auxiliary pump return lin 46.

With the vehicle in motion and the propeller shaft assembly 16 being driven by the engine, the auxiliary pump 40 will provide pressure in the auxiliary pump outlet line 44 and this fluid pressure is delivered by connected port 74 to a port 78 located in the valve element 54 and between lands $a$ and $b$. Port 78 is connected via a central passage 80 in the valve element 54 to make this auxiliary pump pressure available to act on the right-hand end of the valve element and oppose the primary pump pressure acting on the opposite end of the valve element. However, so long as the engine-driven primary pump 32 continues to operate, the power steering gear unit 22, which is connected by valve 48 between the discharge and intake sides of the primary pump 32, always provides a restriction to fluid flow so that the back pressure or system pressure maintained downstream of pump 32 in lines 38 and 30 and acting on the left-hand end of the valve element 54 will always exceed the pump pressure provided by the auxiliary pump 40 to maintain the valve's primary pump operating condition recognizing that the latter pump will be recirculating and not have such a flow restriction which would cause pressure build up at its discharge side.

If while the vehicle is in motion pressure is lost in the primary pump discharge line 38, such as would result from engine stoppage or breakage of the primary pump driving belt 34, the auxiliary pump 40 will still provide pressure for power assist since it will continue to be driven by the rear wheels through the propeller shaft assembly 16 so long as the vehicle remains in motion. This pressure which now acts unopposed on the right-hand end of valve element 54 urges this valve element to the left to abut with plug 56, as shown in FIGURE 2, to place the valve 48 in its auxiliary pump operating condition. The valve 48 in this condition then connects the auxiliary pump outlet line 44 between lands $a$ and $b$ to the gear unit feed line 28 and the gear unit return line 30 between lands $b$ and $c$ to the auxiliary pump return line 46. At the same time, the primary pump 32 is disconnected from the power steering gear unit 22 by the land $a$ which blocks port 64 and connected line 38 from line 28 and land $c$ which blocks port 72 connected to line 36. Thus, power assisted steering remains available after loss of primary pump pressure and will continue to be available as long as the propeller shaft assembly 16 is turning, being adequate down to low vehicle speeds.

It is desirable that the vehicle operator be aware of the fact that the auxiliary pump 40 is being required to serve the power steering gear unit 22. For that purpose there is provided an indicating light 82 suitably arranged in the vehicle so as to be visible to the vehicle operator. This light is controlled so as to be turned on when the vehicle is at rest with the engine ignition circuit closed but the engine not yet started and when auxiliary pumping operation is utilized to serve for power assist.

This is accomplished by locating the light 82 in the engine ignition circuit which has a D.C. voltage supply 84 provided by the vehicle storage battery whose electrical energy is made available when the engine ignition switch 85 is closed to light the light 82 through an electrical line 86 by the closing of a switch assembly generally designated at 88 located in the end plug 58. Line 86 which has insulation 90 is potted in and extends through a boss 92 provided on plug 58 to connect with an electrical conducting washer 94 seated on the bottom of an insulating cup and fluid seal 96 accommodated in a recess provided in plug 58. A stationary contact for the switch is provided by a collar 98 press fitted in an accommodating counterbore provided in plug 58 and has an aperture for slidably receiving a nonconducting bumper 100. The bumper 100 is urgeable against a sliding electrical contact provided by a cup 102 slidable in cup 96 and a metal compression spring 104 compressed between washer 94 and cup 102 provides an electrical connection between these members and serves to urge the slidable cup or contact 102 to contact with the stationary contact 98 to complete the circuit to light the light 82.

The bumper 100 is arranged to be engaged by the righthand end of the valve element 54 so that when valve element 54 is in the position shown in FIGURES 1 and 3 for the primary pump operating condition, the bumper 100 is held in the position shown in FIGURE 3 to break contact in the electrical circuit by holding the sliding contact 102 off the stationary contact 98. When the valve element 54 assumes its position for the auxiliary pump operating condition as shown in FIGURE 2, the valve element 54 leaves its engagement with the bumper 100 and the spring 104 brings the sliding contact 102 into contact with the stationary contact 98 to complete the circuit to light the light 82 and inform the vehicle operator that the auxiliary pump is serving the power steering system. The light 82 is also lit when the vehicle is at rest with the ignition switch closed provided the engine is not yet started since there will be no primary pump pressure to resist the closing of switch 88 by spring 104.

Another feature of this invention is in the construction of the auxiliary pump 40 with its drive connection to the propeller shaft assembly 16. The auxiliary pump construction, as best shown in FIGURE 4–6, is located on the slip yoke 106 of the universal joint 108 which connects the transmission output shaft 110 to the propeller shaft assembly 16, observing that the slip yoke 106 is internally splined to mate with the externally splined transmission output shaft 110 so as to permit sliding movement of the yoke 106 relative to the transmission output shaft 110 during vehicle operation.

The pump body 112 is restrained from rotation and longitudinal movement by a bracket 114 which is bolted to the pump body by bolts 116 and welded to a clamp member 118 which is split and clamped to a collar portion 120 of the transmission by tightening of a clamping bolt 122. The pump 40 is a conventional pump of the internal rotor type with the pump body 112 rotatably supporting the outer or driven gear 124 eccentric relative to the axis of the driving gear 126 which has one less tooth. The gear 126 is nonslidably keyed by a key 128 to a drive sleeve 130 which is rotatably supported at its opposite ends in the pump body by antifriction bearings 132 and 134 and the sleeve 130 is in turn slidably keyed by a key and keyways 136 to the sliding yoke 106, gear 126 being located concentric with yoke 106. The purpose of the sliding keyway connection 136 is to permit the sliding yoke 106 to move axially relative to the drive sleeve 130 and thus relative to the gear 126 and the pump body 112 which is held against movement on the transmission 14. Suitable seal assemblies 138 and 140 provide fluid seals between the pump body and the drive sleeve 130 and, in addition, retain sleeve 130 in position in the pump body. The pump 40 pumps fluid in a conventional manner receiving fluid at its intake side from intake porting 142 which is connected with lines 42 and 46 and discharges the fluid under pressure to discharge porting 144. The fluid under pressure in the discharge porting 144 is delivered through a connected passage 146 to a flow control valve assembly 148 located in the pump body which controls the final flow rate to the pump's outlet line 44. Discharge fluid may also be bypassed by valve 148 via passage 149 to the intake porting 142.

The flow control valve assembly comprises a pump fitting 150 for line 44 threadably secured to the pump body and having a stem 152 which extends into one end of a bore 154 in the pump body. The bore 154 contains a bypass spool valve element 156 which in turn contains a relief valve 158 biased by a spring 160 and seating on a seat provided by a plug 162 threaded into the bypass valve element. The latter is urged leftwardly by a spring 164 to abut with the right-hand end of the stem 152.

With valve element 156 abutting the stem 152, bypass passage 149 is blocked and a groove 166 in the left-hand end face of valve element 156 connects the discharge passage 146 with a central stem passage 168 which provides a flow control orifice through which the fluid is finally delivered to the outlet line 44. A passage 170 in fitting 150 connects the downstream side of orifice 168 to chamber 172 within which the spring 164 is confined, this connection being via a passage 174 in the valve body which includes a restricted passage section 176 to gain a damping effect.

To described the operation of the flow control valve 148, let it be assumed that the propeller shaft assembly 16 and connected driving pump gear 126 are rotating at a slow rate. Under these conditions, the entire output of the pump passes through the flow control orifice 168 to the outlet line 44 to serve the system if that is called for, the bypass spool valve element 156 remaining in its shown position preventing flow from the discharge passage 146 to the bypass passage 149. Now upon speeding up of the propeller shaft assembly and consequently of the driving pump gear, a pressure drop develops across orifice 168 with the result that the bypass valve element 156 is displaced against the resistance of the spring 164 and the fluid contained in the chamber 172 to allow for passage of the excess discharge fluid into the pump's intake porting via bypass passage 149, this bypassed fluid flow being the excess over the flow necessary to satisfy downstream system requirements as determined by calibration of valve 148.

The relief valve 158 operates such that at any time the power steering system pressure, i.e. the pressure in outlet line 44 when connected to gear unit 22 attains a value exceeding the setting of the relief valve, ball 158 becomes displaced to vent the chamber 172 to the bypass passage 149 via radial passages 178 in the necked portion of the spool valve element 156. While the flow control valve 148 is preferred for use in the pump 40, a control valve, such as the flow control valve preferred for use in pump 32 and set forth in aforementioned United States patent application Serial No. 283,219, may be employed.

An alternative mounting of the auxiliary pump is shown in FIGURE 7 and is illustrated by the mounting of pump 180 which has the same pump components and operates hydraulically in the same manner as pump 40. In this instance the rotating pump parts are prevented from moving longitudinally relative to the driving slip yoke 182 and the pump body 184, while being restrained from rotation, is permitted to slip with the slip yoke 182. This is accomplished by having the driving gear 186 nonslidably keyed by a key 188 to the drive sleeve 190 and the drive sleeve 190 in turn nonslidably keyed by a key 192 to the slip yoke 182. Snap rings 194 and 196 received in grooves in the slip yoke 182 engage the outer sides of the pump's seal assemblies to positively prevent longitudinal movement of the pump body and the rotating pump parts relative to the slip yoke.

A bracket 198 is rigidly secured by bolts 200 to bosses 202 provided on the transmission housing 204. A bushing 206 is retained in an aperture provided in bracket 198 and slidably receives a dowel or torque pin 208 which is press fitted in a bore 210 in pump body 184.

Torque pin 208 extends parallel to the axis of the slip yoke 182 and since the rotating parts of the pump are prevented from moving longitudinally relative to the slip yoke, any slip in the drive line is taken by the complete pump assembly by the torque pin 208 sliding in bushing 206. The flexibility of the pump's hydraulic lines permits such pump movement.

The auxiliary pump while preferably driven off the propeller shaft may also be separately engine driven to provide a second fluid pressure source in the event the primary pump stops while the engine continues to run as, for example, would occur if the primary pump drive belt breaks. The auxiliary pump may also be driven by a suitable electric motor where a continuous second fluid pressure source is desired.

This invention may be modified within the scope of the appended claims.

We claim:

1. In combination with a vehicle having an engine and driving wheels connected through a propeller shaft assembly to an output of a variable ratio transmission powered by said engine, a power steering system comprising a first pump having outlet and return passages and connected to be driven by said engine, a second pump having outlet and return passages and connected to be driven by said driving wheels, said second pump being firmly secured to said transmission and having rotor means arranged concentric with and connected to said propeller shaft assembly, a valve for connecting in a first condition the outlet and return passages of said first pump with the system while interconnecting the outlet and return passages of said second pump when said first pump is operating and for connecting in a second condition the outlet and return passages of said second pump with the system while blocking the outlet and return passages of said first pump from the system when said first pump is not operating and said propeller shaft assembly is driving said second pump.

2. In combination with a vehicle having an engine and driving wheels connected through a propeller shaft assembly to an output of a variable ratio transmission powered by said engine, a power steering system comprising a first pump having first outlet and return passages and connected to be driven by said engine, a second pump having second outlet and return passages and connected to be driven by said driving wheels, said second fluid pump having a pump housing and rotor means housed by said pump housing and arranged concentric with said propeller shaft assembly, means for preventing movement of said pump housing relative to said transmission, means for drivingly connecting said rotor means to said propeller shaft assembly while permitting relative longitudinal movement therebetween, a valve for selectively connecting said pumps to the system comprising a valve element responsive to fluid pressure delivery to said first outlet passage by said first fluid pump to move to a first pump operating position to connect said first outlet and return passages to the system and to interconnect said second outlet and return passages, said valve element being held in said first pump operating position by the pressure in the system delivered by said first fluid pump and against any pressure delivered to said second outlet passage by said second fluid pump, said valve element being further responsive to fluid pressure delivery to said second outlet passage by said second fluid pump whenever there occurs loss of fluid pressure in said first outlet passage to move to a second pump operating position to connect said second outlet and return passages to the system and to block said first outlet and return passages from the system.

3. In combination with a vehicle having an engine and driving wheels connected through a propeller shaft assembly to an output of a variable ratio transmission powered by said engine, a power steering system comprising a first pump having first outlet and return passages and connected to be driven by said engine, a second pump having second outlet and return passages and connected to be driven by said driving wheels, said second fluid pump having a pump housing and rotor means housed in said pump housing and arranged concentric with said propeller shaft assembly, means for preventing longitudinal movement between said pump housing and said propeller shaft assembly, means for preventing rotational and longitudinal movement of said rotor means relative to said propeller shaft assembly, means operatively connecting said pump housing to said transmission for preventing rotational movement of said pump housing relative to said propeller shaft assembly and permitting longitudinal movement of said pump housing with said propeller shaft assembly, a valve for selectively connecting said pumps to the system comprising a valve element responsive to fluid pressure delivery to said first outlet passage by said first fluid pump to move to a first pump operating position to connect said first outlet and return passages to the system and to interconnect said second outlet and return passages, said valve element being held in said first pump operating position by the pressure in the system delivered by said first fluid pump and against any pressure delivered to said second outlet passage by said second fluid pump, said valve element being further responsive to fluid pressure delivery to said second outlet passage by said second fluid pump whenever there occurs loss of fluid pressure in said first outlet passage to move to a second pump operating position to connect said second outlet and return passages to the system and to block said first outlet and return passages from the system.

References Cited

UNITED STATES PATENTS

| | | | |
|---|---|---|---|
| 2,857,584 | 10/1958 | Gibson | 340—60 |
| 3,006,148 | 10/1961 | Hause. | |
| 3,065,810 | 11/1962 | Chambers et al. | 180—53 |
| 3,280,557 | 10/1966 | Sattavara | 180—79.2 X |

OTHER REFERENCES

Jablonsky, Erich, German DAS 1,157,945, published Nov. 21, 1963.

A. HARRY LEVY, *Primary Examiner.*